US009012812B2

United States Patent
Anzai et al.

(10) Patent No.: US 9,012,812 B2
(45) Date of Patent: Apr. 21, 2015

(54) SEAT HEATER

(75) Inventors: Kenji Anzai, Zama (JP); Hiroki Nagayama, Yokohama (JP); Hajime Oi, Yokohama (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 0 days.

(21) Appl. No.: 13/575,209

(22) PCT Filed: Jan. 31, 2011

(86) PCT No.: PCT/JP2011/051929
§ 371 (c)(1),
(2), (4) Date: Jul. 25, 2012

(87) PCT Pub. No.: WO2011/093493
PCT Pub. Date: Aug. 4, 2011

(65) Prior Publication Data
US 2012/0292301 A1  Nov. 22, 2012

(30) Foreign Application Priority Data
Feb. 1, 2010  (JP) .................................. 2010-020395

(51) Int. Cl.
H05B 1/02 (2006.01)
H05B 3/00 (2006.01)
H05B 11/00 (2006.01)
B60L 1/02 (2006.01)
B60N 2/56 (2006.01)

(52) U.S. Cl.
CPC .................................. B60N 2/5685 (2013.01)

(58) Field of Classification Search
USPC .................................. 219/217, 202, 212, 200
See application file for complete search history.

(56) References Cited

U.S. PATENT DOCUMENTS

| 2009/0001778 A1 | 1/2009 | Nathan et al. | |
| 2009/0008377 A1* | 1/2009 | Nathan et al. | 219/217 |
| 2010/0095443 A1* | 4/2010 | Nishimura et al. | 4/237 |

FOREIGN PATENT DOCUMENTS

| CN | 2199893 Y | 6/1995 |
| CN | 201002544 Y | 1/2008 |
| DE | 10 2008 020 391 A1 | 1/2009 |
| JP | 61-95361 U | 6/1986 |
| JP | 8-20225 A | 1/1996 |
| JP | 10-97889 A | 4/1998 |
| JP | 2003-332030 A | 11/2003 |
| JP | 2008-183209 A | 8/2008 |
| JP | 2009-178247 A | 8/2009 |

OTHER PUBLICATIONS

Japanese Office Action mailed on Jan. 17, 2012 corresponding to Japanese Application No. 2010-020395, 5 pgs.
Japanese Office Action mailed on Apr. 3, 2012 corresponding to Japanese Application No. 2010-020395, 4 pgs.
Supplementary European Search Report dated Jan. 7, 2014, (5 pgs.).
Chinese Office Action, Mar. 25, 2014, 6 pages.

* cited by examiner

Primary Examiner — Tu B Hoang
Assistant Examiner — Lindsey C Teaters
(74) Attorney, Agent, or Firm — Foley & Lardner LLP

(57) ABSTRACT

A seat heater (10) that is provided on a seat (1) including a seat cushion (2) and a seat back (3) includes a first heating element (12U) provided in an upper section (3Lu) of a backrest (3L) in the seat back (3) and a second heating element (12L) provided in a lower section (3Ll) of the backrest (3L) in the seat back (3). In addition, a heat generation density of the first heating element (12U) is lower than a heat generation density of the second heating element (12L).

16 Claims, 4 Drawing Sheets

SEAT HEATER

TECHNICAL FIELD

The present invention relates to a seat heater including heating elements provided on a seat.

BACKGROUND ART

As a conventional seat heater provided on a seat for a vehicle, a seat heater in which heating elements are embedded in a seating surface of a seat cushion and a backrest surface of a seat back is known (for example, refer to Patent Document 1).

In the above-described seat heater, the heating elements on the seat cushion are separately provided in a seat front section and a seat rear section, and the heating elements on the seat back are separately provided in a backrest upper section and a backrest lower section. In addition, a gap between heating wires of the seat rear section and the backrest lower section is narrowed. Accordingly, the seat rear section of the seat cushion and the backrest lower section of the seat back can be locally and rapidly heated in an early stage of heating.

CITATION LIST

Patent Literature

Patent Document 1: Japanese Patent Unexamined Publication No. H08-020225

SUMMARY OF THE INVENTION

However, such a conventional seat heater heats the seat back concentrating only on the backrest lower section during rapid heating. Thus, a sense of rapid heating that is how rapidly a passenger feels the warmth is not satisfactory for consumed power.

The backrest lower section of the seat back corresponds to a position of the lower back of the passenger. Therefore, since multiple layers of clothing including a jacket, trousers and a belt are generally located around the lower back of the passenger, it takes a certain amount of time to make the skin of the passenger feel warm. Although the lower back is a body part that sufficiently feels comfortable when being heated, a sense of rapid heating is not satisfactory for consumed power as described above. Thus, there is a problem with an efficiency of rapid heating with respect to power consumption.

The present invention has been made in view of such a conventional problem. It is an object of the present invention to a seat heater capable of increasing a sense of rapid heating and comfort while reducing power consumption.

A seat heater according to an aspect of the present invention provided on a seat including a seat cushion and a seat back, the seat heater including: a first heating element provided in an upper section of a backrest in the seat back; and a second heating element provided in a lower section of the backrest in the seat back. In addition, a heat generation density of the first heating element is lower than a heat generation density of the second heating element.

DESCRIPTION OF THE EMBODIMENTS

Figure 1:
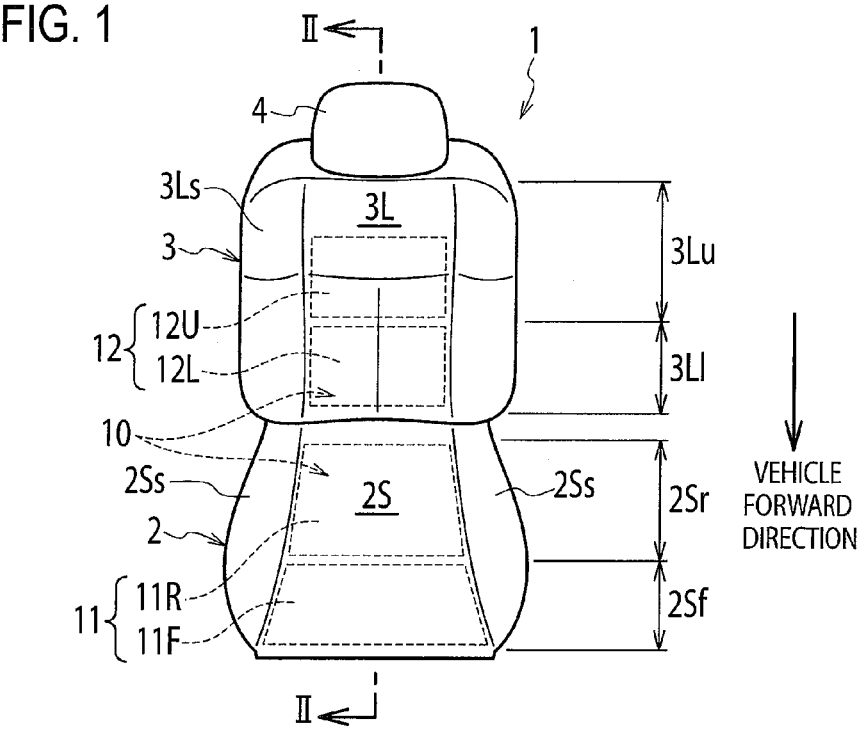
FIG. 1 is a front view of a seat including a seat heater according to an embodiment of the present invention.
Figure 2:
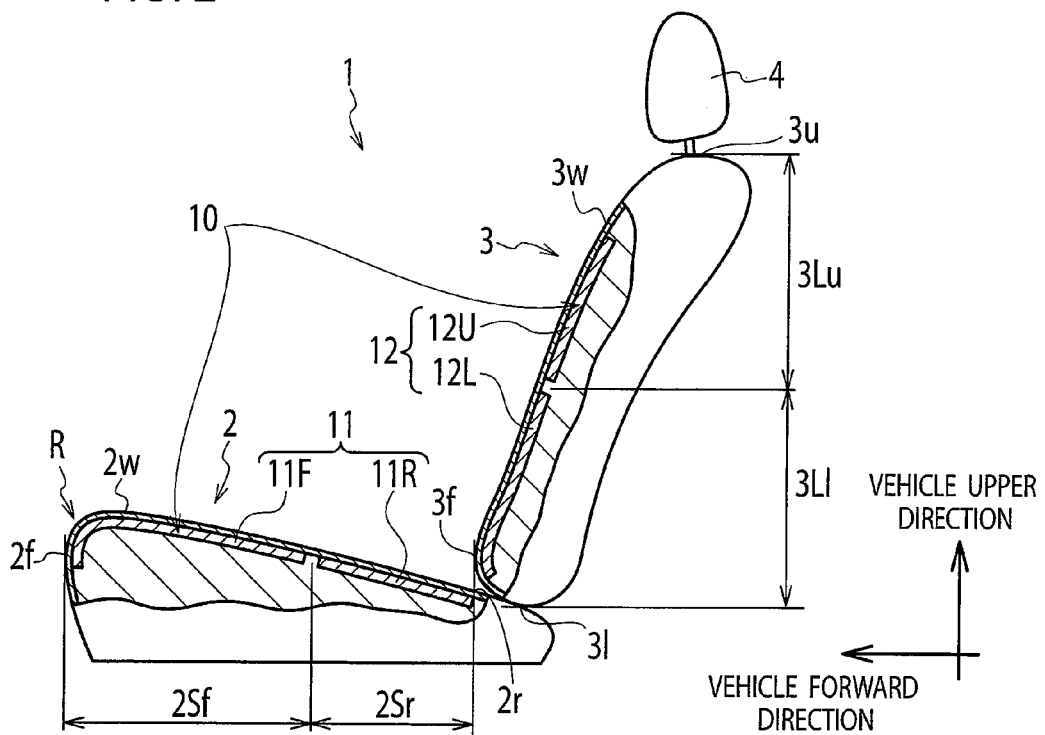
FIG. 2 is a cross-sectional view taken along the line II-II in FIG. 1.

An embodiment of the present invention will be described with reference to the drawings. As shown in FIGS. 1 and 2, a seat 1 of the present embodiment described herein is an example of a bucket-type or separate-type seat installed inside a vehicle not shown in the Figs.

The seat 1 includes a seat cushion 2 on which a passenger sits, a seat back 3 on which the sitting passenger leans, and a headrest 4. The seat cushion 2 is positioned approximately parallel to a floor of a vehicle (not shown in the Figs), and the surface of a cushion material attached to a seat cushion frame of the seat cushion 2 is covered with an upholstery material 2w such as leather and fabric. The seat back 3 has a reclining mechanism (not shown in the Figs.) through which a lower end portion of a seat back frame is connected to a rear end portion of the seat cushion frame, so that the seat back 3 is capable of tilting movement in the longitudinal direction of the vehicle. In addition, the surface of a cushion material of the seat back 3 attached to the seat back frame is covered with an upholstery material 3w.

Figure 3:
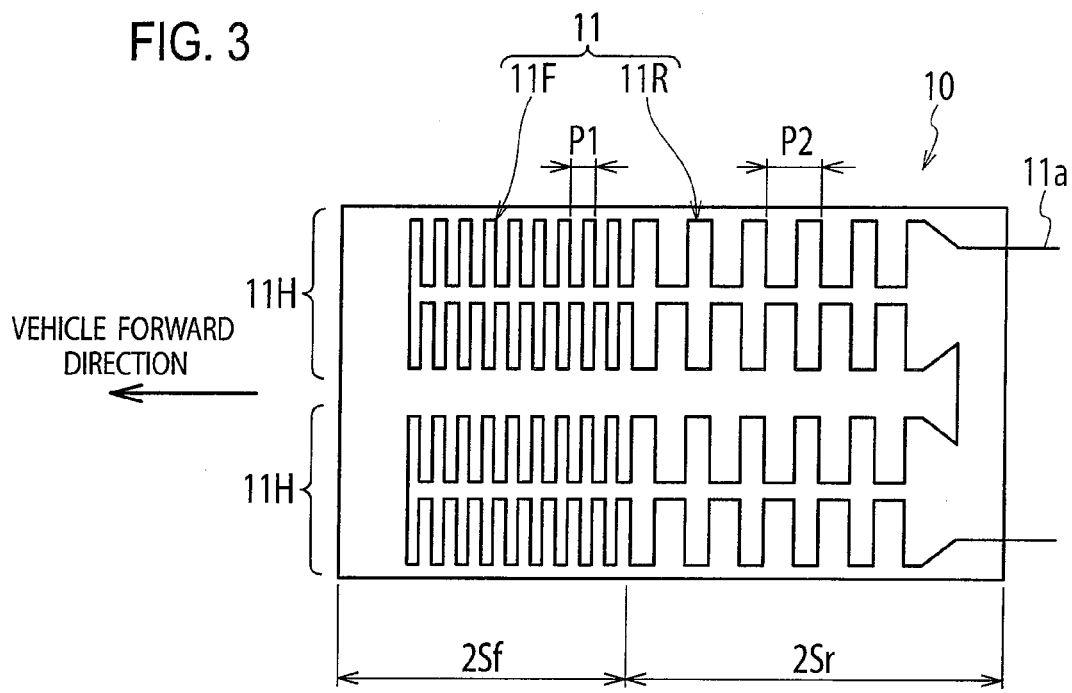
FIG. 3 is a planar pattern view of wiring of heating elements provided on a seat cushion of the seat shown in FIG. 1.

A seat heater 10 of the present embodiment includes a seat bottom heater 11 provided as a heating element on a seat surface 2S on which a passenger sits. As shown in FIG. 3, the seat bottom heater 11 is provided with an electric resistance wire 11a such as a nichrome wire having a predetermined resistance value to generate heat by current conduction. The electric resistance wire 11a is extensively provided under the upholstery material 2w. The extensively provided electric resistance wire 11a includes a pair of heating elements 11H symmetrically arranged and accordion-folded in each way. The heating elements 11H (the electric resistance wire 11a) generate heat by a current supplied from a power source such as a battery by operating a switch (not shown in the Figs) so as to heat the seat surface 2S. While the heating elements 11H of the seat bottom heater 11 are accordion-folded and arranged parallel to each other, the heating elements 11H are composed of the single electric resistance wire 11a. Note that the way of the wiring of the electric resistance wire 11a is not limited to the accordion fold, and any other way may be employed as long as the electric resistance wire 11a can be efficiently arranged in a planar state.

In the present embodiment, as shown in FIGS. 1 and 2, the seat surface 2S of the seat cushion 2 is partitioned (divided) into a seat front section 2Sf and a seat rear section 2Sr. Further, as shown in FIG. 3, a pitch P1 of the electric resistance wire 11a arranged in the seat front section 2Sf is smaller than a pitch P2 of the electric resistance wire 11a arranged in the seat rear section 2Sr. Due to such a configuration, a heat generation density of the seat front section 2Sf is increased more than a heat generation density of the seat rear section 2Sr. Here, a heat generation density Hd is defined as a value obtained by dividing a heat generation amount Hq of a heater by an area Hs of the heater, that is, Hd=Hq/Hs. Namely, the heat generation density Hd of the seat front section 2Sf is obtained by dividing the heat generation amount Hq of a front heater 11F by the area of the seat front section 2Sf provided with the front heater 11F. Note that the seat front section 2Sf does not include side support sections 2Ss not provided with the front heater 11F as described below. The heat generation density of the seat rear section 2Sr can also be obtained in the same manner as the seat front section 2Sf.

The seat surface 2S is divided into a region of the seat front section 2Sf and a region of the seat rear section 2Sr in a predetermined proportion. For example, in the present embodiment, the region of the seat front section 2Sf accounts for 30% to 50% of the area between the front end 2f and the rear end 2r of the seat cushion 2, and the region of the seat rear section 2Sr accounts for the rest of the area that is 50% to 70%. The seat front section 2Sf is expected to be a region on which the thighs of the passenger are positioned, and the seat rear section 2Sr is expected to be a region on which the buttocks of the passenger are positioned. Here, the rear end 2r of the seat cushion 2 is on the same planar surface as a front end 3f of the seat back 3 in the longitudinal direction of the vehicle, as shown in FIG. 2.

In the case in which the seat cushion 2 is a bucket seat not shown in the Figs, raised side support sections 2Ss may be provided on both sides of the seat surface 2S. However, the side support sections 2Ss are excluded from the seat front section 2Sf and the seat rear section 2Sr in the present embodiment. In other words, the side support sections 2Ss are not provided with the seat heater 11.

As described above, the seat bottom heater 11 includes the front heater 11F provided in the seat front section 2Sf and a rear heater 11R provided in the seat rear section 2Sr. As shown in FIG. 2, the seat front section 2Sf includes an arc-like angular part R provided on the top of the front end 2f of the seat cushion 2. The arc-like angular part R is also provided with the front heater 11F along the arc surface. In the present embodiment, a heat generation density Hdf of the seat front section 2Sf and a heat generation density Hdr of the seat rear section 2Sr are preferably defined in a predetermined ratio. For example, the heat generation density Hdf and the heat generation density Hdr may be defined in the ratio of Hdf: Hdr=(3.0 to 4.5):1.

In addition, as shown in FIGS. 1 and 2, the seat heater 10 of the present embodiment includes a back heater 12 provided as a heating element on the seat back 3. The back heater 12 is provided approximately on the entire region of the seat back 3 excluding both side sections 3Ls of a backrest surface 3L. The back heater 12 includes an electric resistance wire 12a that is extensively provided under an upholstery material 3w as in the case of the seat bottom heater 11.

Figure 4:
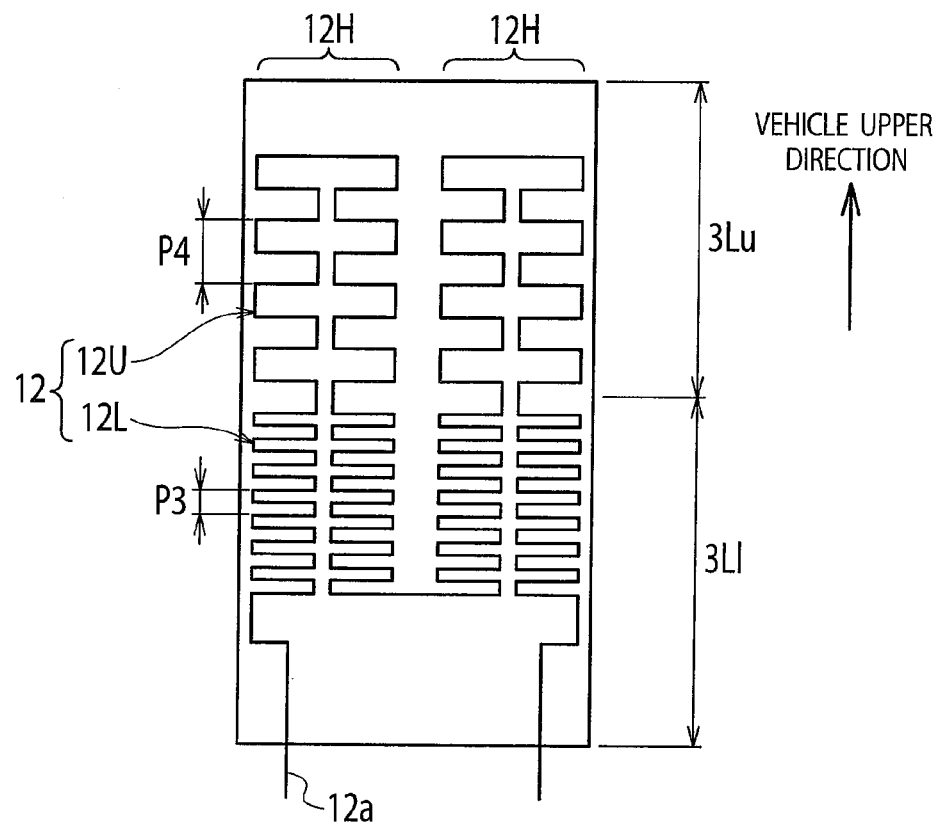
FIG. 4 is a planar pattern view of wiring of heating elements provided on a seat back of the seat shown in FIG. 1.

As shown in FIG. 4, the back heater 12 includes a pair of heating elements 12H symmetrically arranged and accordion-folded in each way. The heating elements 12H (the electric resistance wire 12a) generate heat by a current supplied from a power source such as a battery by operating a switch (not shown in the Figs) so as to heat the backrest surface 3L. While the heating elements 12H of the back heater 12 include an upper heater 12U and a lower heater 12L that are accordion-folded and arranged parallel to each other, the heating elements 12H are composed of the single electric resistance wire 12a. Note that the way of the wiring of the electric resistance wire 12a is not limited to the accordion fold, and any other way may be employed as long as the electric resistance wire 12a can be efficiently arranged in a planar state.

In the present embodiment, a region of a backrest upper section 3Lu provided with the upper heater 12U and a region of a backrest lower section 3Ll provided with the lower heater 12L are divided in a predetermined proportion in a vertical direction, as shown in FIGS. 1 and 2. For example, in the present embodiment, the region of the backrest lower section 3Ll accounts for 30% to 60% of the area between a lower end 3l and an upper end 3u of the seat back 3 in the vertical direction of a vehicle, and the region of the backrest upper section 3Lu accounts for the rest of the area that is 40% to 70%. The backrest upper section 3Lu is expected to be a region on which the back of the passenger is positioned, and the backrest lower section 3Ll is expected to be a region on which the lower back of the passenger is positioned.

The present embodiment is characterized in that the backrest upper section 3Lu of the seat back 3 is provided with the upper heater 12U that is a heating element, and a heat generation density of the upper heater 12U is lower than a heat generation density of the lower heater 12L of the backrest lower section 3Ll. That is, a pitch P3 of the electric resistance wire 12a arranged in the backrest lower section 3Ll is smaller than a pitch P4 of the electric resistance wire 12a arranged in the backrest upper section 3Lu, so that the heat generation density in the backrest lower section 3Ll is higher than the heat generation density in the backrest upper section 3Lu.

The seat heater 10 described above achieves a significant effect when used for a vehicle in which an available electric energy of a battery is constant, such as an electric vehicle (EV) and a hybrid electric vehicle (H-EV) in which a battery is used as a power source and a vehicle in which an internal combustion engine is used as a power source. That is, as described below, the seat heater 10 first heats the backrest lower section 3Ll in which a rapid heating effect is low, prior to heating the backrest upper section 3Lu in which a rapid heating effect is high. Accordingly, it is possible to reduce power consumption of the backrest upper section 3Lu relative to power consumption of the backrest lower section 3Ll. The backrest upper section 3Lu on which a small number of layers of clothing are located requires relatively less time to make the skin of the passenger feel warm relative to the lower back on which multiple layers of clothing are located. Therefore, it is possible to increase a sense of rapid heating while reducing power consumption. In addition, a limited electric energy can be effectively used for heat generation in the seat front section 2Sf on which the thighs are positioned and the backrest lower section 3Ll on which the lower back is positioned. Thus, a sense of comfort can be increased since a large amount of electric power can be applied to the sections corresponding to the thighs and the lower back in which an increased effect of a sense of comfort is high.

According to the present embodiment, the region of the backrest upper section 3Lu provided with the upper heater 12U and the region of the backrest lower section 3Ll provided with the lower heater 12L are divided in a predetermined proportion in a vertical direction as described above. Therefore, the lower back of the passenger can be heated efficiently by the lower heater 12L having high heat generation density.

In the present embodiment, the heat generation density of the upper heater 12U in the backrest upper section 3Lu of the seat back 3 is preferably lower than the heat generation density of the front heater 11F in the seat front section 2Sf of the seat cushion 2 and the heat generation density of the lower heater 12L in the backrest lower section 3Ll. In addition, in the present embodiment, the heat generation density of the lower heater 12L in the backrest lower section 3Ll is preferably higher than the heat generation density of the upper heater 12U in the backrest upper section 3Lu and the heat generation density of the rear heater 11R in the seat rear section 2Sr. A small number of layers of clothing are located on the back of the passenger, and a thermal conductance of the back is low as described below. Therefore, even if the heat generation density of the upper heater 12U is low, a sense of warmth can be rapidly gained and the warmth can be maintained. Accordingly, it is possible to efficiently increase a sense of warmth and comfort by reducing the heat generation density of the upper heater 12U and increasing the heat generation densities of the front heater 11F and the lower heater 12L.

Further, the heat generation density of the upper heater 12U in the backrest upper section 3Lu and the heat generation density of the rear heater 11R in the seat rear section 2Sr are preferably lower than the heat generation density of the front heater 11F in the seat front section 2Sf and the heat generation density of the lower heater 12L in the backrest lower section 3Ll in the present embodiment. As described below, in the case in which the back and the buttocks of the passenger are heated excessively, a sense of comfort may be decreased. Meanwhile, a sense of comfort is increased by heating the lower back and the thighs rather than heating the back and the buttocks. Therefore, the heat generation densities of the heaters located on the lower back and the thighs are higher than the heat generation densities of the heaters located on the back and the buttocks in order to effectively heat the lower back and the thighs to increase a sense of comfort.

Moreover, in the present embodiment, the heat generation density of the upper heater 12U in the backrest upper section 3Lu is preferably lower than the heat generation density of the front heater 11F in the seat front section 2Sf, the heat generation density of the rear heater 11R in the seat rear section 2Sr and the heat generation density of the lower heater 12L in the backrest lower section 3Ll. In particular, it is possible to define the heat generation density of the seat front section 2Sf, the heat generation density of the seat rear section 2Sr, the heat generation density of the backrest lower section 3Ll and the heat generation density of the backrest upper section 3Lu in a predetermined ratio. For example, the heat generation density of the seat front section 2Sf:the heat generation density of the seat rear section 2Sr:the heat generation density of the backrest lower section 3Ll:the heat generation density of the backrest upper section 3Lu may be defined in the ratio of (3.0 to 4.5):1:(2.0 to 3.0):(0.5 to 1.8) in the present embodiment. More preferably, the ratio of the heat generation density of the seat front section 2Sf:the heat generation density of the seat rear section 2Sr:the heat generation density of the backrest lower section 3Ll:the heat generation density of the backrest upper section 3Lu is 4.1:1:2.3:0.6. Accordingly, it is possible to heat the seat front section 2Sf corresponding to the thighs first in an early stage of heating, and keep the seat rear section 2Sr on which the buttocks are positioned at a low temperature during a stable period (during a steady heating period). In addition, the heat generation density of the backrest upper section 3Lu, in which a rapid heating effect is high even with relatively small heat generation density, is lower than the heat generation density of the backrest lower section 3Ll on which the lower back is positioned. As a result, a larger amount of electric power can be distributed to the other sections than the backrest upper section 3Lu to further increase a sense of rapid heating and a sense of comfort during the steady heating period.

The seat heater 10 according to the present embodiment has the above-described configuration in view of human characteristics (such as a difference in sense depending on the parts of the body). Therefore, a limited amount of electric power is distributed to the preferred sections efficiently so as to increase a sense of rapid heating in the adequate parts of the body and maintain a sense of comfort in the entire body.

Figure 5:
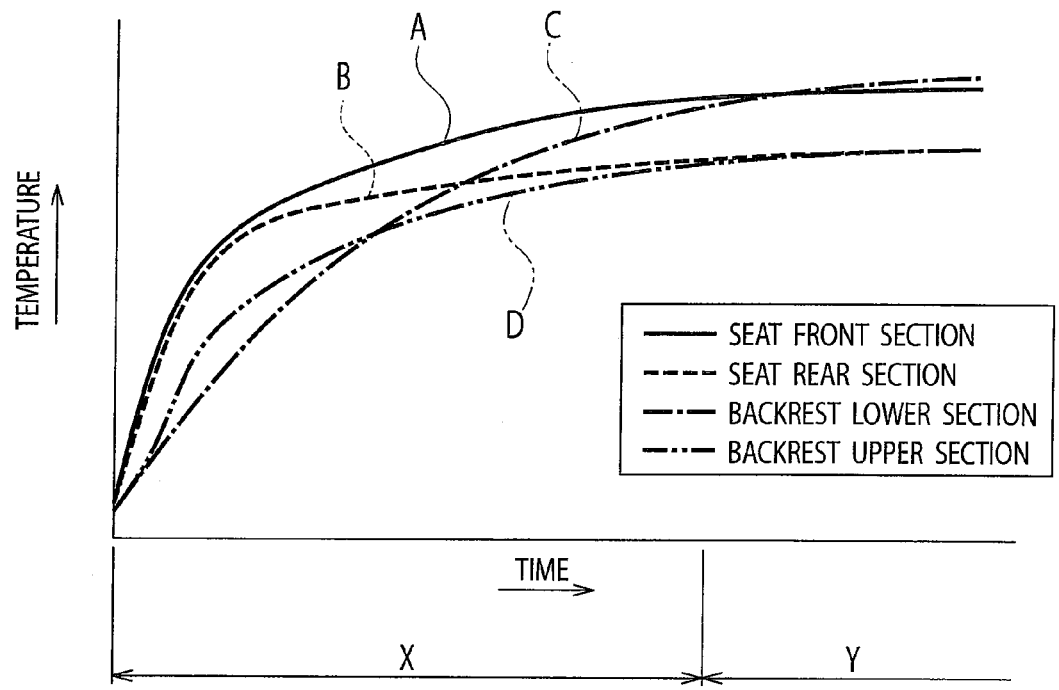
FIG. 5 is a graph showing each change in temperature of a seat front section and a seat rear section of a seat cushion and a backrest upper section and a backrest lower section of a seat back in the seat shown in FIG. 1.

FIG. 5 is a graph showing a change in temperature of the respective surfaces of the seat front section 2Sf, the seat rear section 2Sr, the backrest lower section 3Ll and the backrest upper section 3Lu when the passenger sits on the seat heater 10 according to the present embodiment. The graph of FIG. 5 indicates the temperature of the seat front section 2Sf by a solid line A, the temperature of the seat rear section 2Sr by a dashed line B, the temperature of the backrest lower section 3Ll by an alternate long and short dash line C, and the temperature of the backrest upper section 3Lu by a two-dot chain line D. As shown in the graph, in the early stage of heating (in the section X), the temperature of the seat front section 2Sf is the highest among the respective temperatures of the seat rear section 2Sr, the backrest upper section 3Lu and the backrest lower section 3Ll.

During the steady heating period (in the section Y), after the temperature of the backrest lower section 3Ll reaches the temperature of the seat front section 2Sf, both temperatures are kept approximately at a constant level. In addition, after the temperature of the seat rear section 2Sr and the temperature of the backrest upper section 3Lu reach approximately the same temperature, both temperatures are kept approximately at a constant level. That is, the temperatures of the seat front section 2Sf and the backrest lower section 3Ll are kept at a higher level during the steady heating period than the temperatures of the seat rear section 2Sr and the backrest upper section 3Lu.

In terms of the change in temperature of the respective backrest lower section 3Ll and backrest upper section 3Lu, the temperature of the backrest upper section 3Lu rapidly increases to reach a higher temperature than the backrest lower section 3Ll in the early stage of heating. Then, the temperature of the backrest lower section 3Ll reaches the temperature of the backrest upper section 3Lu and thereafter, the temperature of the backrest lower section 3Ll overtakes the temperature of the backrest upper section 3Lu to reach a higher temperature than the backrest upper section 3Lu. Consequently, the temperature of the backrest lower section 3Ll is kept at a higher level than the temperature of the backrest upper section 3Lu.

Therefore, a sense of rapid heating is increased in the early stage of heating since the temperature of the backrest upper section 3Lu on which the back is located increases faster than the temperature of the backrest lower section 3Ll on which the lower back is located. In addition, a sense of warmth is increased and a sense of discomfort such as humidity on the buttocks can be prevented during the steady heating period since the temperatures of the seat front section 2Sf and the backrest lower section 3Ll are kept at a higher level than the temperatures of the seat rear section 2Sr and the backrest upper section 3Lu. Namely, the temperature at the thighs rapidly increases in the early stage of heating, which contributes to an increase of a sense of warmth most effectively. In addition, the temperatures at the lower back and the thighs are kept at a higher level during the steady heating period. Accordingly, a sense of comfort can be increased.

Here, a sensory test by eight test subjects was carried out by use of the seat 1 provided with the front heater 11F in the seat front section 2Sf, the rear heater 11R in the seat rear section 2Sr, the lower heater 12L in the backrest lower section 3Ll and the upper heater 12U in the backrest upper section 3Lu. The results of the sensitivity test are shown in FIG. 6 and FIG.

7. In this case, the surface temperatures of the respective heaters 11F, 11R, 12L and 12U of the seat 1 can be controlled individually. FIG. 6 is a bar graph showing a sense of warmth by partial heating in each part of the back, the lower back, the buttocks and the thighs of the passenger, and FIG. 7 is a bar graph showing a sense of comfort by partial heating in the respective parts.

Figure 6:
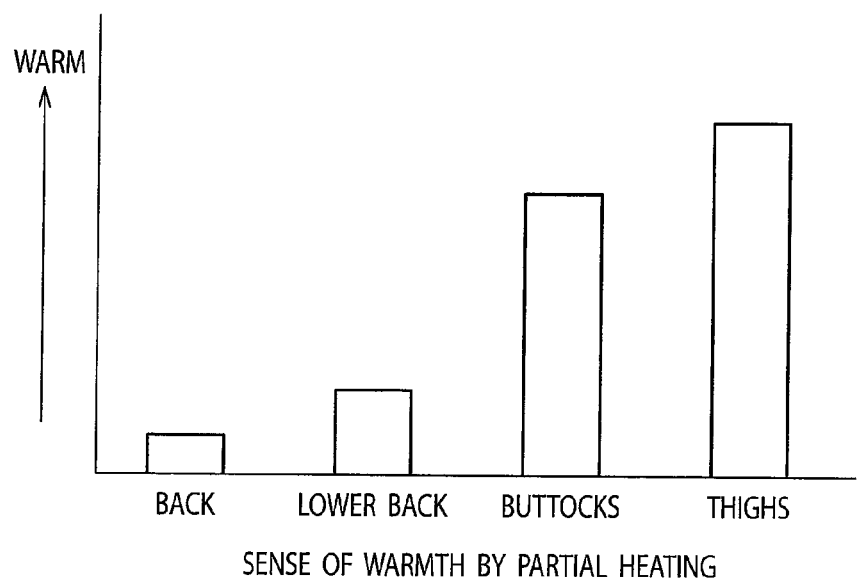
FIG. 6 is a graph showing a sense of warmth by partial heating in each part of a back, a lower back, buttocks and thighs of a passenger sitting on the seat shown in FIG. 1.
Figure 7:
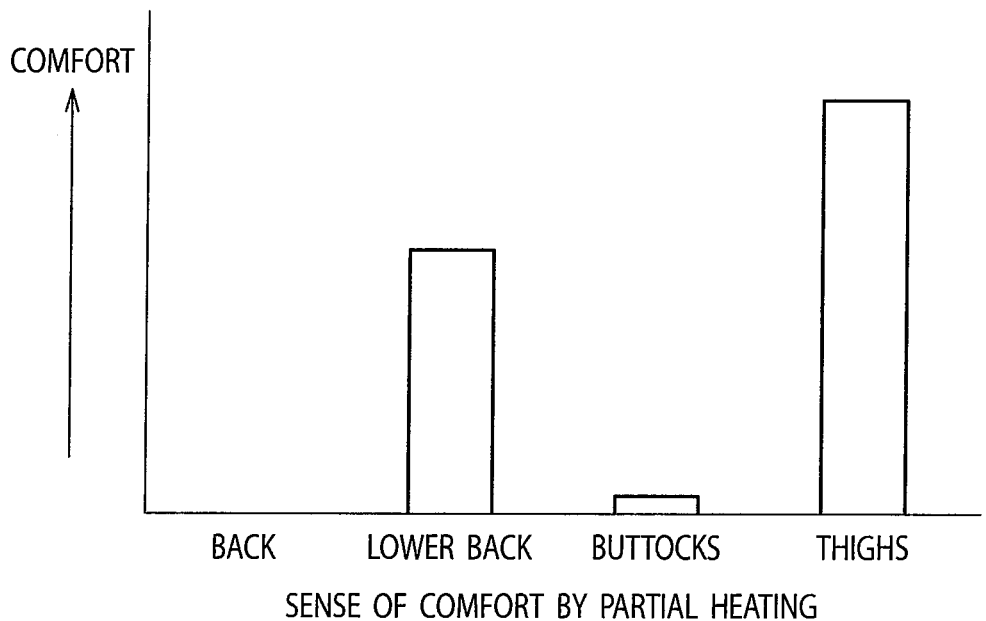
FIG. 7 is a graph showing a sense of comfort by partial heating in each part of a back, a lower back, buttocks and thighs of a passenger sitting on the seat shown in FIG. 1.

(1) With regard to the thighs, an increased effect of a sense of warmth by heating is high (refer to FIG. 6), and an increased effect of a sense of comfort by heating is also high (refer to FIG. 7). In view of these results, the temperature at the thighs in the early stage of heating preferably increases as quickly as possible, and the heat generation density is preferably large in order to keep the temperature high during the steady heating period. Since large arteries are present in the thighs near the surface of the skin, blood flowing to the lower legs from the thighs is heated by heating the thighs. Thus, it is considered that a sense of warmth is easily achieved.

(2) With regard to the buttocks, an increased effect of a sense of warmth by heating is high (refer to FIG. 6). Although a sense of warmth in the early stage of heating can be achieved by heating the buttocks, an increase in temperature during the steady heating period may bring disadvantages such as discomfort because of a sense of humidity or excessive heat. Thus, the heat generation density in the buttocks is preferably low.

(3) With regard to the lower back, an increased effect of a sense of warmth by heating is low (refer to FIG. 6). On the other hand, an increased effect of a sense of comfort by heating is high (refer to FIG. 7). Accordingly, the heat generation density of the lower back is preferably high in order to keep the temperature high during the steady heating period.

(4) With regard to the back, an increased effect of a sense of warmth by heating is low (refer to FIG. 6). In addition, an increased effect of a sense of comfort by heating is also low (refer to FIG. 7). However, since a small number of layers of clothing are located on the back, a sense of warmth can be rapidly gained and the warmth can be maintained in the early stage of heating and during the stable period even if the heat generation density is low. Therefore, the heat generation density of the backrest upper section can be reduced. In view of this, it is preferable to distribute available electric power due to the reduced heat generation density of the backrest upper section to the other sections in which a sense of warmth and comfort would be increased more efficiently.

Figure 8:
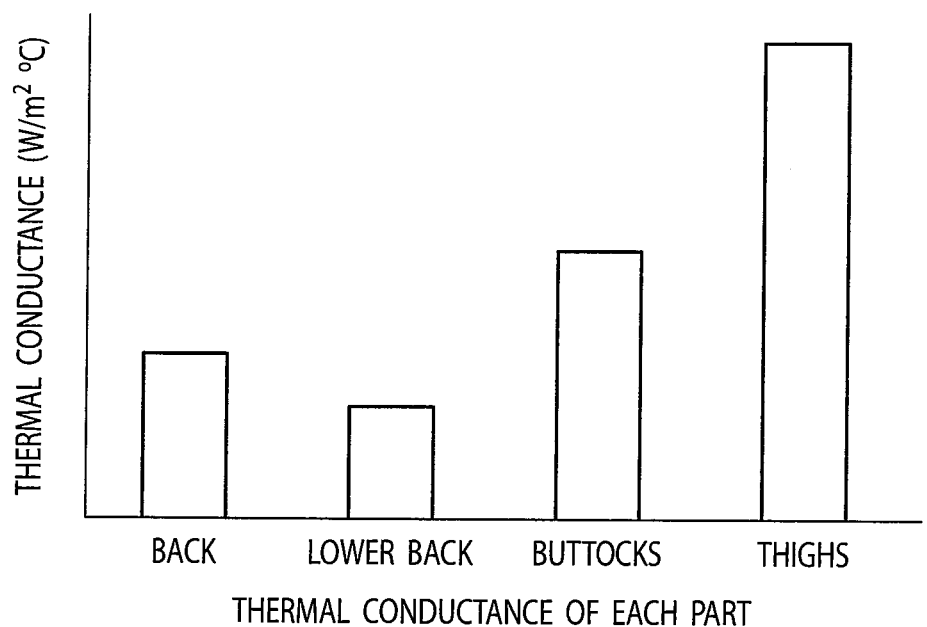
FIG. 8 is a graph showing a thermal conductance in each part of a back, a lower back, buttocks and thighs of a passenger sitting on the seat shown in FIG. 1.

Here, it is considered that the temperature increase in the early stage of heating and the temperature during the steady heating period are influenced by a thermal conductance between the seat and the skin of the passenger, in addition to each heat generation density. The thermal conductance is defined as conductivity per 1° C. of a temperature difference between the surface of the human skin and the surface of the seat, corresponding to an ease of conducting heat. FIG. 8 shows a thermal conductance in each part of the thighs, the buttocks, the lower back and the back during driving a vehicle while the passenger wears typical winter clothes.

Each thermal conductance in the thighs and the buttocks is high compared with the lower back and the back. This means that the temperatures of the thighs and the buttocks rapidly increase in the early stage of heating when the seat temperature is lower than the skin temperature, while the temperatures of the thighs and the buttocks are lower than the temperatures of the lower back and the back during the steady heating period when the seat temperature is higher than the skin temperature, if the heat generation densities of the respective body parts are the same. When the thermal conductance is high, the difference between the seat temperature and the body temperature of the passenger is small because the amount of thermal exchange between the seat and each body part of the passenger is large. This means that the seat temperature tends to reach the body temperature of the passenger particularly at the body part having a larger thermal conductance. In other words, the seat temperature rapidly increases at the body part having a larger thermal conductance in the early stage of heating when the seat temperature is lower than the body temperature, while the seat temperature is stably maintained at lower temperature (closer to the body temperature) during the steady heating period when the seat temperature is higher than the body temperature. Thus, this is considered to be the reason why the temperature increase of the buttocks with low heat generation density is faster than the temperature increase of the lower back with high heat generation density in the test example in FIG. 5. In the embodiment of the present invention described above, the heat generation density of each body part is properly adjusted in view of the above-described points.

The value of each thermal conductance varies depending on clothes which the passenger wears. However, even in the case of regular clothes, the magnitude relation of the thermal conductance of the thighs>the thermal conductance of the buttocks>the thermal conductance of the back>the thermal conductance of the lower back is satisfied. Namely, since the difference of the thermal conductance among the respective body parts of the passenger is more significant than the difference depending on the clothes, the ratio of each heat generation density of the present invention is available even if clothes are changed.

The entire content of Japanese Patent Application No. P2010-020395 (filed on Feb. 1, 2010) is herein incorporated by reference.

Although the invention has been described above by reference to the embodiment, the invention is not limited to the description thereof, and it will be apparent to these skilled in the art that various modifications and changes can be made. For example, the embodiment has been described using the example of the seat for a vehicle; however, the present invention is not limited to this, and may also be applied to seats for other machines such as a plane and seats for theaters.

INDUSTRIAL APPLICABILITY

According to the present invention, the heat generation density of the heating element in the backrest upper section to heat the back on which a small number of layers of clothing are located compared with the lower back is lower than the heat generation density of the heating element in the backrest lower section to heat the lower back. In such a configuration, the temperature at the back rapidly increases since a small number of layers of clothing are located, and a sense of rapid heating is increased even if the heat generation density is low. In addition, an unnecessary temperature increase during the steady heating period can be suppressed since the heat generation density at the back is low. Meanwhile, since multiple layers of clothing including a jacket, trousers and a belt are located around the lower back, it takes a certain amount of time to make the lower back feel warm. However, it is possible to sufficiently heat the lower back during the steady heating period since the heat generation density is high and therefore, a sense of comfort is increased.

REFERENCE SIGNS LIST

1 Seat
2 Seat cushion

2Sf Seat front section
2Sr Seat rear section
3 Seat back
3Ll Backrest lower section
3Lu Backrest upper section
4 Headrest
10 Seat heater
11 Seat bottom heater
11F Front heater (third heating element)
11R Rear heater (fourth heating element)
12 Back heater
12L Lower heater (second heating element)
12U Upper heater (first heating element)

The invention claimed is:

1. A seat assembly, comprising:
a seat configured to be installed in a motor vehicle, the seat including a seat cushion and a seat back;
a first heating element provided in an upper section of a backrest in the seat back and configured to have a first thermal conductance to a passenger;
a second heating element provided in a lower section of the backrest in the seat back and configured to have a second thermal conductance to the passenger that is lower than the first thermal conductance; and
a third heating element provided in a seat front section of the seat cushion and configured to have a third thermal conductance to the passenger that is higher than the second thermal conductance,
wherein a heat generation density of the first heating element is lower than a heat generation density of the second heating element such that power consumption of the first heating element is reduced relative to power consumption of the second heating element to conserve motor vehicle power, and
wherein the heat generation density of the second heating element is lower than a heat generation density of the third heating element such that power consumption of the second heating element is reduced relative to power consumption of the third heating element to conserve motor vehicle power.

2. The seat assembly according to claim 1,
wherein the heat generation density of the first heating element is lower than the heat generation density of the second heating element and the heat generation density of the third heating element.

3. The seat assembly according to claim 1, further comprising:
another heating element provided in a seat rear section of the seat cushion,
wherein the heat generation density of the second heating element is higher than the heat generation density of the first heating element and a heat generation density of another heating element.

4. The seat assembly according to claim 1, further comprising:
a fourth heating element provided in a seat rear section of the seat cushion,
wherein the heat generation density of the first heating element and a heat generation density of the fourth heating element is lower than the heat generation density of the second heating element and the heat generation density of the third heating element.

5. The seat assembly according to claim 1, further comprising:
a fourth heating element provided in a seat rear section of the seat cushion,
wherein the heat generation density of the first heating element is lower than the heat generation density of the second heating element, the heat generation density of the third heating element, and a heat generation density of the fourth heating element.

6. The seat assembly according to claim 1,
wherein the heat generation density of each of the first heating element and the second heating element is defined such that a surface temperature of the upper section of the backrest is higher than a surface temperature of the lower section of the backrest after starting current conduction to the seat heater while a passenger sits on the seat, and
wherein the surface temperature of the lower section of the backrest is higher than the surface temperature of the upper section of the backrest after a lapse of a certain period of time.

7. The seat assembly according to claim 1, wherein the seat cushion is positioned approximately parallel to a floor of the motor vehicle.

8. The seat assembly according to claim 1, wherein the seat is a bucket-type seat or separate-type seat.

9. The seat assembly according to claim 1, wherein a surface of a cushion material attached to a seat cushion frame of the seat cushion is covered with upholstery.

10. The seat assembly of claim 1, wherein the first and second heating elements of the backrest are accordion-folded and symmetrically arranged.

11. The seat assembly according to claim 1, further comprising:
a fourth heating element provided in a seat rear section of the seat cushion,
wherein a heat generation density of the fourth heating element is lower than the heat generation density of the third heating element.

12. A seat heater provided on a seat including a seat cushion and a seat back, the seat heater comprising:
a first heating element provided in an upper section of a backrest in the seat back and configured to consume a first amount of power;
a second heating element provided in a lower section of the backrest in the seat back and configured to consume a second amount of power that is greater than the first amount of power; and
a third heating element provided in a seat front section of the seat cushion and configured to consume a third amount of power that is greater than the second amount of power,
wherein the first heating element is configured to impart a sense of heating more rapidly than the second heating element,
wherein the third heating element is configured to impart a sense of heating more rapidly than the second heating element,
wherein a heat generation density of the first heating element is lower than a heat generation density of the second heating element,
wherein the heat generation density of the second heating element is lower than a heat generation density of the third heating element, and
wherein the seat heater is configured to be installed in a motor vehicle.

13. A seat heater provided on a seat including a seat cushion and a seat back, the seat heater comprising:
a first heating element provided in an upper section of a backrest in the seat back;

a second heating element provided in a lower section of the backrest in the seat back; and a third heating element provided in a seat front section of the seat cushion, wherein a heat generation density of the first heating element is lower than a heat generation density of the second heating element, wherein the heat generation density of the second heating element is lower than a heat generation density of the third heating element, wherein a temperature of the upper section of the backrest increases faster than a temperature of the lower section of the backrest in a first stage of heating so as to impart a sense of rapid heating, wherein a temperature of the seat front section of the seat cushion increases faster than a temperature of the lower section of the backrest in the first stage of heating so as to impart a sense of rapid heating, and wherein the seat heater is configured to be installed in a motor vehicle.

14. A seat heater provided on a seat including a seat cushion and a seat back, the seat heater comprising:

a first heating element provided in an upper section of a backrest in the seat back;

a second heating element provided in a lower section of the backrest in the seat back; and a third heating element provided in a seat front section of the seat cushion, wherein a heat generation density of the first heating element is lower than a heat generation density of the second heating element, wherein the heat generation density of the second heating element is lower than a heat generation density of the third heating element, wherein the heating elements are configured such that a temperature rapidly increases with respect to a first portion of a passenger body having a first thermal conductance between a human skin surface and a seat surface, which the first thermal conductance exceeds a second thermal conductance of a second portion of the passenger body, and wherein the seat heater is configured to be installed in a motor vehicle.

15. A seat heater provided on a seat including a seat cushion and a seat back, the seat heater comprising:

a first heating element provided in an upper section of a backrest in the seat back;

a second heating element provided in a lower section of the backrest in the seat back; and a third heating element provided in a seat front section of the seat cushion, wherein a heat generation density of the first heating element is lower than a heat generation density of the second heating element, wherein the heat generation density of the second heating element is lower than a heat generation density of the third heating element, wherein the heat generation density of each of the first heating element and the second heating element is such that a surface temperature of the upper section of the backrest is higher than a surface temperature of the lower section of the backrest after starting current conduction to the seat heater while a passenger sits on the seat, wherein the surface temperature of the lower section of the backrest is higher than the surface temperature of the upper section of the backrest after a lapse of a certain period of time, wherein the heat generation density of each of the third heating element and the second heating element is such that a surface temperature of the seat front section of the seat cushion is higher than a surface temperature of the lower section of the backrest after starting current conduction to the seat heater while a passenger sits on the seat, wherein the surface temperature of the lower section of the backrest is higher than the surface temperature of the seat front section of the seat cushion after a lapse of a certain period of time, and wherein the seat heater is configured to be installed in a motor vehicle.

16. A method of heating a seat in a vehicle, comprising:

controlling a temperature of a seat front section so as to be higher than a temperature of a seat rear section, a temperature of a lower section of a backrest, and a temperature of an upper section of the backrest, controlling the temperature of the lower section of the backrest so as to attain the temperature of the seat front section, and maintaining the temperatures of the lower section of the backrest and the seat front section so as to be constant and so as to exceed the temperatures of the seat rear section and the upper section of the backrest.

* * * * *